United States Patent [19]

Nishida et al.

[11] 4,415,050

[45] Nov. 15, 1983

[54] DRIVE PUMP ARRANGEMENT FOR WORKING VEHICLE

[75] Inventors: Chikashi Nishida, late of Osaka, by Shinobus Nishida, Legal representative; Yoshishiro Okita, Sakai, Japan; Ryoichi Tanaka, Neyagawa, Japan; Takeshi Kajimoto; Hitoo Nasu, both of Sakai, Japan

[73] Assignee: Kubota, Ltd., Osaka, Japan

[21] Appl. No.: 335,286

[22] Filed: Dec. 28, 1981

[30] Foreign Application Priority Data

Dec. 26, 1980 [JP] Japan ................................ 55-191014

[51] Int. Cl.³ ............................................. B62D 11/04
[52] U.S. Cl. ..................................... 180/6.48; 74/491; 180/6.58; 180/315
[58] Field of Search ................. 180/6.48, 6.2, 6.7, 180/6.58, 6.28, 6.32, 336, 315; 60/464, 466; 74/491

[56] References Cited

U.S. PATENT DOCUMENTS

| 3,850,258 | 11/1974 | Bauer | 180/6.48 |
| 4,154,314 | 5/1979 | Tsuji et al. | 180/6.7 |
| 4,261,431 | 4/1981 | Hawbaker | 180/6.48 |
| 4,355,693 | 10/1982 | Hirooka et al. | 180/6.48 |

*Primary Examiner*—Joseph F. Peters, Jr.
*Assistant Examiner*—Donn McGiehan
*Attorney, Agent, or Firm*—Cushman, Darby & Cushman

[57] ABSTRACT

A working vehicle comprising two pumps for driving hydraulic motors provided for opposite running devices individually and a valve mechanism for bringing the vehicle into a low-speed state wherein a fluid is supplied from the pumps to the motors individually, or alternatively into a high-speed state wherein the combined fluid from the pumps is supplied to the motors in series. The vehicle is provided with an operating assembly for preventing the vehicle from turning at a high speed even when the vehicle is inadvertently so operated by the driver in the high-speed state.

3 Claims, 6 Drawing Figures

4,415,050

DRIVE PUMP ARRANGEMENT FOR WORKING VEHICLE

BACKGROUND OF THE INVENTION

1. Field of the Invention

The present invention relates to a working vehicle comprising two pumps for driving hydraulic motors provided for opposite running devices individually, a valve mechanism for bringing the vehicle into a low-speed state wherein a fluid is supplied from the pumps to the motors individually or alternatively into a high-speed state wherein the combined fluid from the pumps is supplied to the motors in series, valves for reversibly rotating and stopping the motors individually, and manual operating means provided for each of the valves.

2. Description of the Prior Art

With the above working vehicle, the mode of supply of the fluid is changed by a simple improvement, i.e. merely by the provision of the valve mechanism, to drive the vehicle at a high speed or low speed selectively with ease. However, there is the likelihood that the driver will inadvertently manipulate the operating means for a turning or revolving travel while running the vehicle at a high speed, possibly causing the vehicle to fall down.

SUMMARY OF THE INVENTION

In view of the above drawback of the prior art, the object of the present invention is to provide a working vehicle which can be reliably prevented from turning about or revolving while running at a high speed.

The working vehicle of this invention is equipped with an operating assembly for the above-mentioned valve mechanism in addition to the foregoing conventional construction. The operating assembly comprises a power supply circuit for an electric operating unit for bringing the valve mechanism into the high-speed state when energized, a manual switch and a safety switch which are connected in series with the power supply circuit, the safety switch being provided with a driven cam and attached to one of the operating means, and a cam-type operating member provided for the driven cam and attached to the other operating means. The safety switch is closed when both the operating means are in a specific position relative to each other for running the vehicle straight. The safety switch is opened when the operating means are brought out of the specific position to run the vehicle in a turning or revolving state.

Thus, directing attention to the specific relative position that the two operating means assume except when manipulated for turning or revolution, we have succeeded in avoiding any revolution of the vehicle during the high-speed running by detecting a change in the relative position by a cam action and automatically operating the safety switch by the cam-type operating member to open the circuit of the operating assembly for the valve mechanism when the vehicle is brought into a revolving state and thereby automatically change the running state to a low-speed state even if the vehicle is running at a high speed. Accordingly the vehicle is reliably prevented from revolving at the high speed by an inexpensive construction which utilizes a cam mechanism.

DESCRIPTION OF THE PREFERRED EMBODIMENTS

Figure 1:
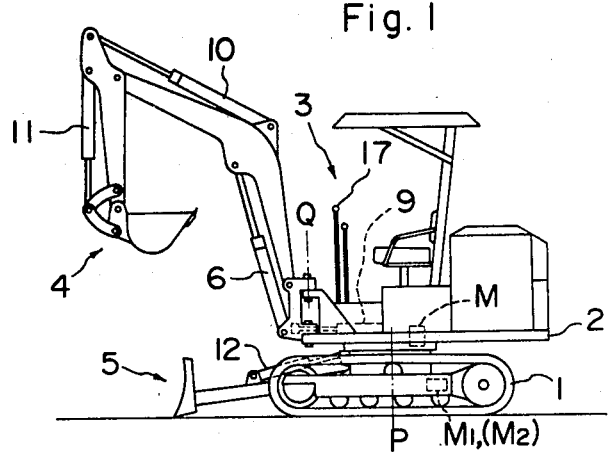
FIG. 1 is an overall side elevation showing a working vehicle embodying the invention.
Figure 3:
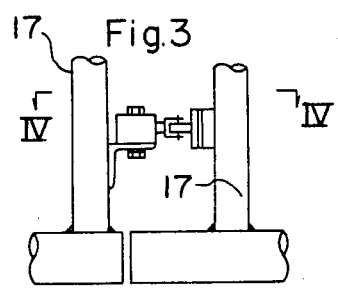
FIG. 3 is a fragmentary front view of the embodiment.
Figure 4:
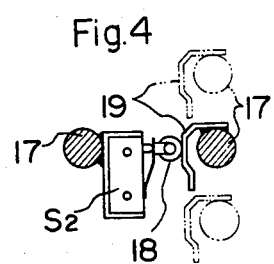
FIG. 4 is a view in section taken along the line IV—IV in FIG. 3.

A vehicle body equipped with a pair of opposite crawlers 1, 1 has a support 2 which is swivelable about a vertical axis P and which carries a steering or operating assembly 3. A backhoe 4 attached to the front portion of the swivel support 2 is drivingly turnable about a vertical axis Q. A dozer 5 pivotally movable upward and downward is attached to the vehicle body. By virtue of the swivel and turn about the axes P and Q, the single working vehicle is adapted for both the removal of earth and excavation including excavation alongside the vehicle body.

Figure 2:
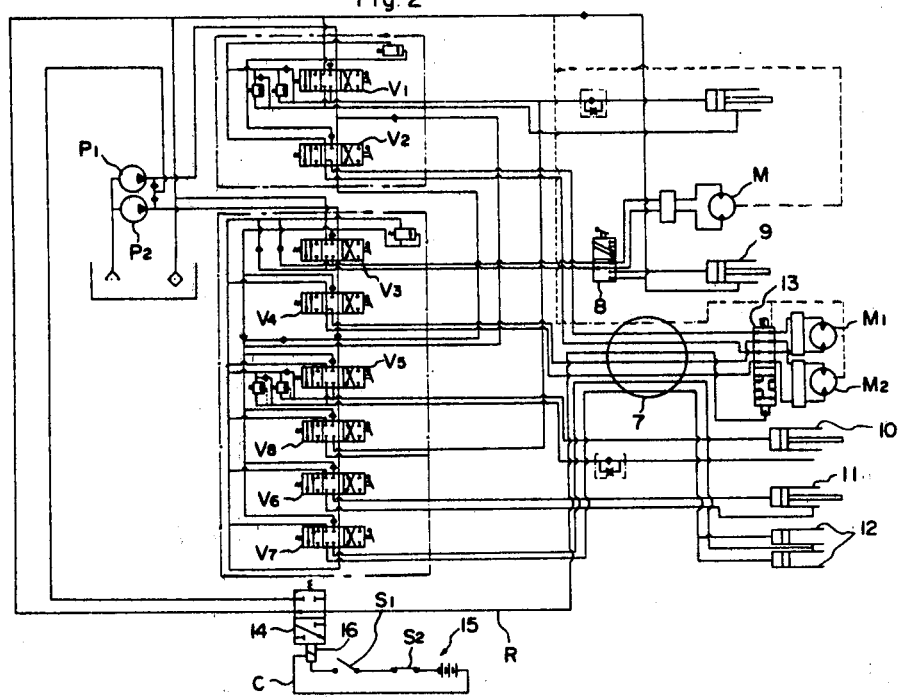
FIG. 2 is a diagram showing the hydraulic circuit of the embodiment.

The crawler running devices 1, 1, the swivel support 2 and the two working devices 4, 5 are driven by oil pressure as an example of hydraulic pressure. As seen in FIG. 2, two pumps, namely a first pump P1 and a second pump P2, are mounted on the swivel support 2. The pressure oil from the first pump P1 is supplied to a boom cylinder 6 via a first control valve V1 and also to a first running motor M1 via a second control valve V2 and a rotary joint 7. On the other hand, the pressure oil from the second pump P2 is supplied to a swivel motor M or alternatively to an excavator turning cylinder 9 via a third control valve V3 and a changeover valve 8, to a second running motor M2 via a fourth control valve V4 and the rotary joint 7, and to an arm cylinder 10 and a bucket cylinder 11 via fifth and sixth control valves V5, V6 respectively. The pressure oil from the two pumps P1, P2 is also confluently supplied to a pair of dozer cylinders 12, 12 via a seventh control valve V7 and the rotary joint 7. To operate the boom at an increased speed, the pressure oil from the second pump P2 is further supplied to the boom cylinder 6 via an eighth control valve V8.

At a location downstream from the rotary joint 7, a confluence valve 13 is provided for the first and second motors M1, M2. A flow channel R is provided to supply the pressure oil from the first and second pumps P1, P2 to the confluence valve 13 via the rotary joint 7 for operating the valve 13. An electromagnetic two-position changeover valve 14 for opening and closing the flow channel R is disposed in the channel on the swivel support 2. The changeover valve 14 constitutes a valve mechanism for bringing the vehicle into a high-speed running state in which oil streams from the first and second hydraulic pumps P1, P2 are combined and supplied to the first and second hydraulic motors M1, M2 in series, or alternatively into a low-speed running state in which the oil streams are supplied to these motors individually.

An operating assembly 15 for the valve mechanism comprises a power supply circuit C for a solenoid 16 serving as an electric operating unit for the changeover valve 14, a manual switch S1 coupled to a high-low speed change pedal, and a safety switch S2 which is operated as coupled to manual operating means 17, 17 for operating the control valves V2, V4 for the opposite running devices respectively. The switches S1, S2 are connected in series with the power supply circuit C. Stated more specifically, the opposite manual operating means 17, 17 are arranged in proximity to each other and are pivotally movable about the same axis. The safety switch S2 is attached to one of the manual operating means 17, 17 and provided with a driven cam 18 for opening and closing the switch S2. A cam-type operating member 19 for the driven cam 18 is attached to the other operating means 17. Only when both the manual operating means 17, 17 are located in the same position, namely in forward, neutral or reverse position, in which they are in parallel to each other in register when seen from one side, that is, only when the manual operating means are in a specific position relative to each other, the safety switch S2 is closed by the action of the cam-type operating member 19 on the driven cam, such that when the confluence valve 13 is changed over by the pedal, the vehicle can be driven at a high speed. On the other hand, the safety switch S2 is opened automatically when the manual operating means 17, 17 are brought out of the above-mentioned specific relative position, i.e. when one of the operating means is shifted to the forward or reverse position with the other means in the neutral position to cause the vehicle to pivotally revolve about one crawler running device 1, or when one manual operating means is shifted to the forward position with the other means brought to the reverse position to spin the vehicle about the center of the vehicle body. Consequently the solenoid 16 is de-energized to bring the vehicle into a low-speed running state even if the vehicle is held in the high-speed running state.

Figure 5:
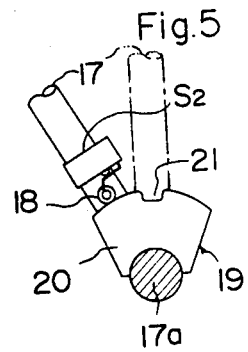
FIG. 5 is a side elevation showing operating means according to another embodiment.

FIG. 5 shows another embodiment in which a safety switch S2 of the normally closed type is attached to one of the manual operating means 17, 17. A driven cam 18 mounted on the same means is shiftable in a radial direction with respect to the axis of the pivotal movement of the operating means 17. A pivot 17a connected to the other operating means 17 is provided with a cam-type operating member 19 in the form of a sector member 20 having a recessed portion 21 at a specified location in its outer periphery. Only when both the manual operating means 17, 17 are in a specific position relative to each other permitting the vehicle to run at a high speed, the driven cam 18 fits in the recessed portion 21 to close the safety switch S2.

Figure 6:
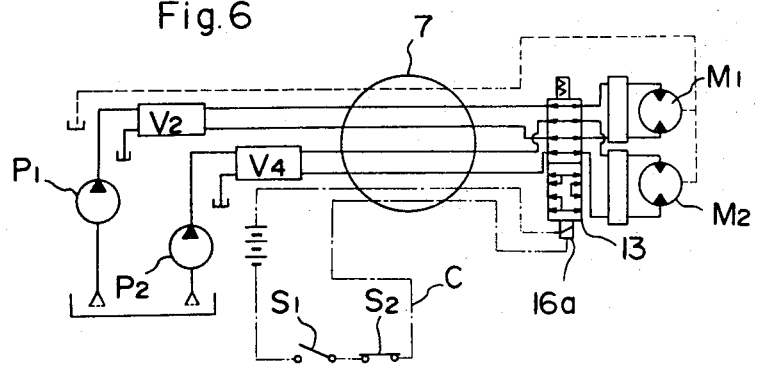
FIG. 6 is a fragmentary circuit diagram showing another embodiment.

FIG. 6 shows another embodiment in which the foregoing confluence valve 13 is of the electromagnetic type. The aforementioned power supply circuit C is connected, by electric wiring via the rotary joint 7, to a solenoid 16a serving as an electric operating unit for the confluence valve 13. Thus the confluence valve 13 can be changed over electrically without necessitating the pressure oil flow channel R used for changing over the confluence valve 13 in the first embodiment.

We claim:
1. A working vehicle having two pumps P1, P2 for driving hydraulic motors M1, M2 provided for opposite running devices 1, 1 respectively, a valve mechanism for bringing the vehicle into a low-speed state wherein a fluid is supplied from the pumps P1, P2 to the motors M1, M2 respectively or alternatively into a high-speed state wherein the combined fluid from the pumps P1, P2 is supplied to the motors M1, M2 in series, valves V2, V4 for reversibly rotating and stopping the motors M1, M2 respectively, and manual operating means 17, 17 provided for the valves V2, V4 respectively, the working vehicle comprising an operating assembly 15 provided for the valve mechanism and including a power supply circuit C for an electric operating unit 16 or 16a for bringing the valve mechanism into the high-speed state when energized, a manual switch S1, a safety switch S2 provided with a driven cam 18, the switches S1, S2 being connected in series with the power supply circuit C, the safety switch S2 being attached to one of the manual operating means 17, 17, and a cam-type operating member 19 provided for the driven cam 18 and attached to the other operating means 17, the safety switch S2 being closed when both the operating means 17, 17 are in a specific position relative to each other for running the vehicle straight, the safety switch S2 being opened when the operating means 17, 17 are brought out of the specific relative position to run the vehicle in a turning state.

2. A working vehicle as defined in claim 1 wherein the safety switch S2 attached to one of the operating means 17, 17 is of the normally closed type, the driven cam 18 being mounted on said one operating means 17 and shiftable in a radial direction with respect to the axis of the pivotal movement of said one operating means 17, the cam-type operating member 19 being mounted on a pivot 17a connected to said other operating means 17 and comprising a sector member 20 having a recessed portion 21 at a specified location in its outer periphery, whereby only when both the operating means 17, 17 are in the specific relative position permitting the vehicle to run at a high speed, the driven cam 18 is fitted in the recessed portion 21 to close the safety switch S2.

3. A working vehicle as defined in claim 1 which has a rotary joint 7 and wherein the valve mechanism is provided with a confluence valve 13 having a solenoid 16a, the power supply circuit C being connected to the solenoid 16a by electric wiring via the rotary joint 7, whereby the confluence valve 13 is changed over electrically.

* * * * *